(12) United States Patent
Kim et al.

(10) Patent No.: US 8,654,091 B2
(45) Date of Patent: Feb. 18, 2014

(54) MOBILE TERMINAL AND METHOD FOR CONTROLLING MOBILE TERMINAL

(75) Inventors: Minjoo Kim, Seoul (KR); Isu Byun, Seoul (KR); Jiwoon Kim, Seoul (KR); Sanghyuck Lee, Bucheon-si (KR); Inyong Hwang, Gwangmyeong-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 13/103,945

(22) Filed: May 9, 2011

(65) Prior Publication Data

US 2012/0046079 A1    Feb. 23, 2012

(30) Foreign Application Priority Data

Aug. 23, 2010    (KR) .................. 10-2010-0081269

(51) Int. Cl.
*G06F 3/048*    (2013.01)
(52) U.S. Cl.
USPC ........................... 345/173; 345/174; 715/810
(58) Field of Classification Search
USPC ........... 345/173; 715/835, 863, 765, 810, 811
See application file for complete search history.

(56) References Cited

U.S. PATENT DOCUMENTS

| | | | |
|---|---|---|---|
| 2008/0220752 A1* | 9/2008 | Forstall et al. | 455/415 |
| 2009/0058821 A1 | 3/2009 | Chaudhri et al. | |
| 2009/0061837 A1 | 3/2009 | Chaudhri et al. | |
| 2010/0024020 A1* | 1/2010 | Baugher et al. | 726/7 |
| 2010/0146384 A1* | 6/2010 | Peev et al. | 715/255 |
| 2011/0105193 A1* | 5/2011 | Lee et al. | 455/566 |
| 2012/0060123 A1* | 3/2012 | Smith | 715/833 |
| 2012/0319984 A1* | 12/2012 | Borovsky et al. | 345/173 |

FOREIGN PATENT DOCUMENTS

CN    101561742    10/2009

\* cited by examiner

*Primary Examiner* — Kent Chang
*Assistant Examiner* — Nelson Rosario
(74) *Attorney, Agent, or Firm* — Lee, Hong, Degerman, Kang & Waimey

(57) ABSTRACT

A mobile terminal is provided. The mobile terminal comprises: a touchscreen controllable to display at least one home screen or a lock screen; and a controller configured to: control the touchscreen to display the at least one home screen when the mobile terminal is in a standby state, one of the at least one home screen displaying at least one application object including one or more widget objects; and control the touchscreen to display the lock screen when the mobile terminal is switched from the standby state to a locked state. The lock screen displays a specific widget object of the one or more widget objects if the specific widget object was selected by a user for the lock screen.

33 Claims, 23 Drawing Sheets

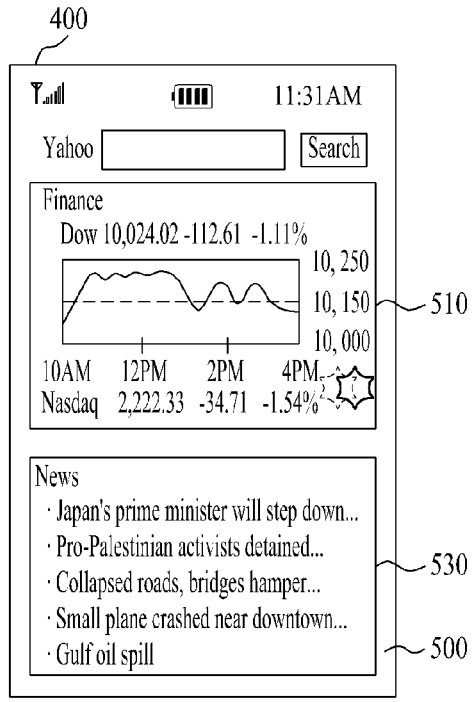
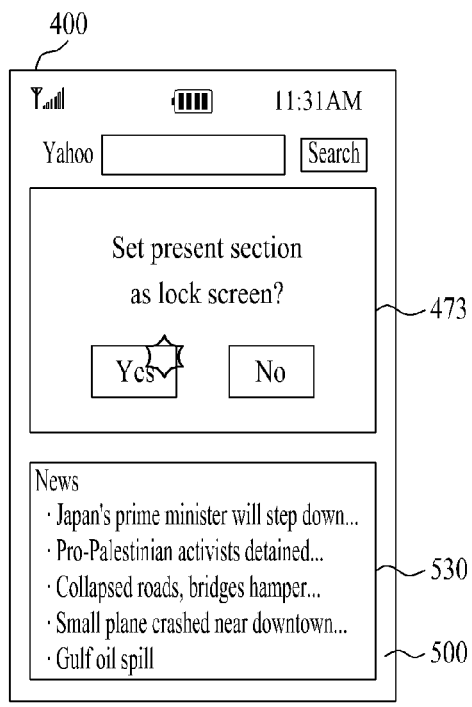

MOBILE TERMINAL AND METHOD FOR CONTROLLING MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2010-0081269, filed on Aug. 23, 2010, the contents of which are hereby incorporated by reference herein in their entirety.

FIELD OF THE INVENTION

Embodiments of the present invention are related to a mobile terminal, and more particularly, to a mobile terminal and a method of controlling a mobile terminal. Although features disclosed herein are suitable for a wide scope of applications, they are particularly suitable for configuring a terminal in view of enhancing user convenience.

DISCUSSION OF THE RELATED ART

A mobile terminal is a device which may be configured to perform various functions. Examples of such functions include facilitating data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to their degree (e.g., ease) of mobility. Further, the mobile terminals can be further classified into handheld terminals and vehicle mount terminals according to the manner of portability.

There are ongoing efforts to support and increase the functionality of mobile terminals. Such efforts include software and hardware improvements, as well as changes and improvements in the structural components which form the mobile terminal. In order to prevent a malfunction or an incorrect (or inadvertent) manipulation of a mobile terminal or protect a privacy of a user of the mobile terminal, a lock function can be applied to the mobile terminal. There are many ongoing efforts to research and develop a method of enabling a mobile terminal to enter a locked state or enabling the mobile terminal to be released from the locked state in view of enhancing convenience of usage.

SUMMARY

Accordingly, embodiments of the present invention are directed to a mobile terminal and a method of controlling the mobile terminal that substantially obviate one or more problems due to limitations and disadvantages of the related art.

Particular embodiments of the present invention are directed towards providing a mobile terminal and a method of controlling the mobile terminal, which may enter a locked state or be released from the locked state, in view of enhancing convenience of usage.

Additional advantages, objects, and features of the invention will be set forth in the disclosure herein as well as the accompanying drawings. Such aspects may also be appreciated by those skilled in the art based on the disclosure herein.

According to one embodiment, a mobile terminal comprises: a touchscreen controllable to display at least one home screen or a lock screen; and a controller configured to: control the touchscreen to display the at least one home screen when the mobile terminal is in a standby state, one of the at least one home screen displaying at least one application object including one or more widget objects; and control the touchscreen to display the lock screen when the mobile terminal is switched from the standby state to a locked state. The lock screen displays a specific widget object of the one or more widget objects if the specific widget object was selected by a user for the lock screen.

According to one embodiment, a method of controlling a mobile terminal comprises: controlling a touchscreen of the mobile terminal to display at least one home screen when the mobile terminal is in a standby state, one of the at least one home screen displaying at least one application object including one or more widget objects; and controlling the touchscreen to display a lock screen when the mobile terminal is switched from the standby state to a locked state. The lock screen displays a specific widget object of the one or more widget objects if the specific widget object was selected by a user for the lock screen.

It is to be understood that both the foregoing general description and the following detailed description of the present invention are exemplary and explanatory and are intended to provide further explanation of claimed embodiments of the invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. The above and other aspects, features, and advantages of the present invention will become more apparent upon consideration of the following description of various embodiments, taken in conjunction with the accompanying drawing figures. In the drawings:

FIGS. 11A, 11B, and 11C are views of display screen configurations for illustrating a method of controlling a mobile terminal according to an embodiment of the present invention;

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
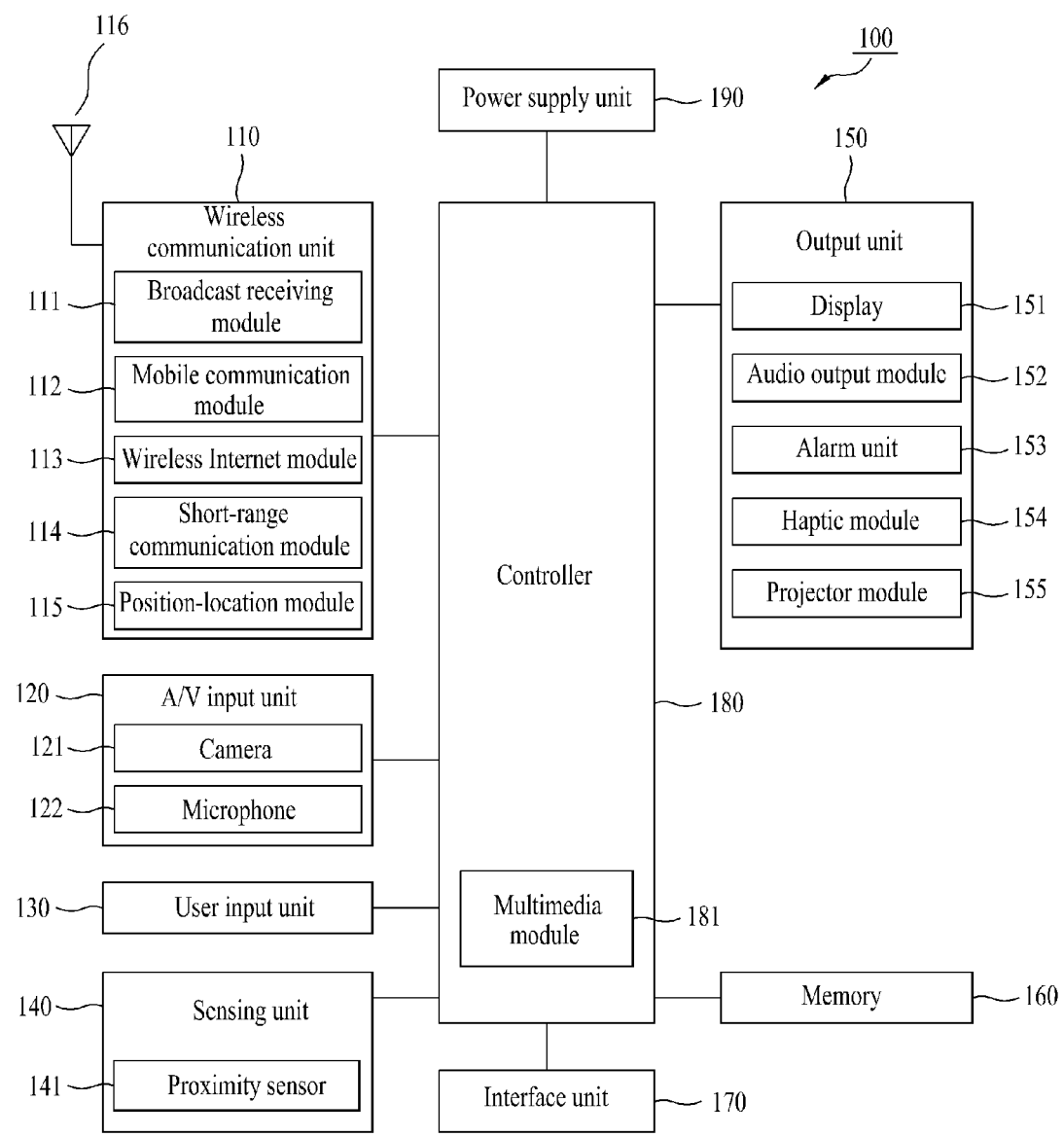
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal and/or broadcast associated information received by the broadcast receiving module 111 may be stored in a suitable device, such as the memory 160.

The broadcast signal may be implemented as a TV broadcast signal, a radio broadcast signal, and/or a data broadcast signal, among other signals. If desired, the broadcast signal may further include a broadcast signal combined with a TV or radio broadcast signal. At least two broadcast receiving modules 111 can be provided in the mobile terminal 100 to facilitate simultaneous reception of at least two broadcast channels or broadcast channel switching.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution). Wireless Internet access by Wibro™, HSPDA, GSM, CDMA, WCDMA, or LTE is achieved via a mobile communication network. In this regard, the wireless Internet module 113 may be configured to perform the wireless Internet access via the mobile communication network similar to the mobile communication module 112.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time informations are then amended (or corrected) using another satellite. In addition, the GPS module 115 is able to calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this case, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The projector module 155 is an element for performing an image projector function using the mobile terminal 100. The projector module 155 is able to display an image, which is identical to or at least partially different from the image displayed on the display 151, on an external screen or wall according to a control signal of the controller 180.

In particular, the projector module 155 can include a light source (not shown in the drawing) generating light (e.g., a laser) for projecting an external image, an image producing means (not shown in the drawing) for producing an external image to project using the light generated from the light source, and a lens (not shown in the drawing) for enlarging the external image according to a predetermined focal distance. Furthermore, the projector module 155 can further include a device (not shown in the drawing) for adjusting an image projection direction by mechanically moving the lens or the whole module.

The projector module 155 can be a CRT (cathode ray tube) module, an LCD (liquid crystal display) module, or a DLP (digital light processing) module according to a device type. In particular, the DLP module is operated by enabling the light generated from the light source to reflect on a DMD (digital micro-mirror device) chip and can be advantageous for reducing the size of the projector module 155.

Preferably, the projector module 155 can be provided in a lengthwise direction of a lateral, front or backside direction of the mobile terminal 100. Furthermore, it is understood that the projector module 155 can be provided in any portion of the mobile terminal 100 as deemed necessary.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 is able to operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2A:
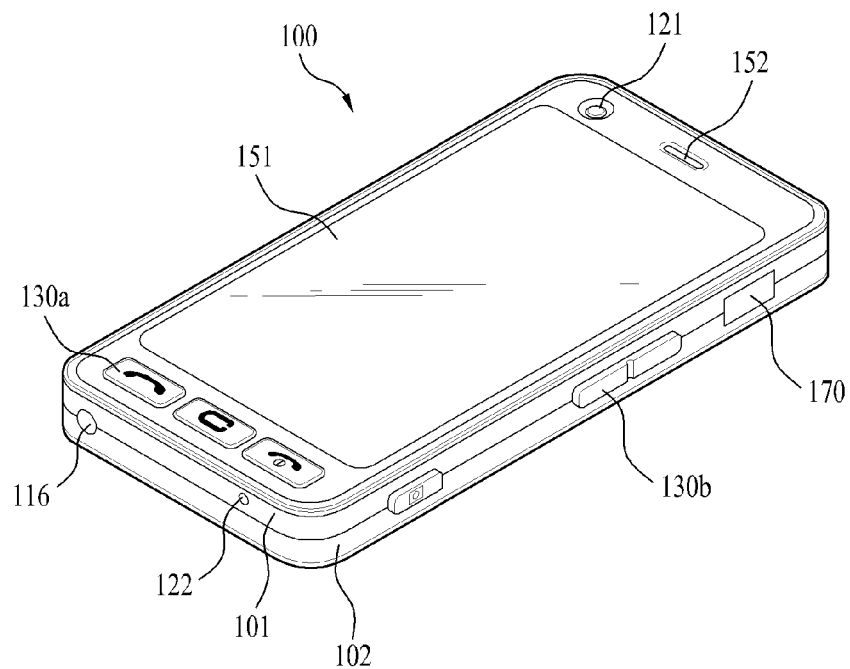
FIG. 2A is a front perspective view of a mobile terminal according to one embodiment of the present invention.

FIG. 2A is a front perspective view of a mobile terminal according to one embodiment of the present invention. The mobile terminal 100 illustrated in FIG. 2A has a bar type terminal body. However, the mobile terminal 100 may be implemented in a variety of different configurations.

Examples of such configurations include folder-type, slide-type, rotational-type, swing-type and combinations thereof. For ease of description, the following disclosure will primarily relate to a bar-type mobile terminal 100. However, it is understood that such disclosure may apply equally to other types of mobile terminals.

Referring to FIG. 2A, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130 (see FIG. 1).

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by the first or second manipulating unit 131 or 132 can be divided between the two. For instance, a command such as start, end, and scroll is input to the first manipulating unit 131. Furthermore, a command for a volume adjustment of sound output from the audio output module 152, or a command for a switching to a touch recognizing mode of the display 151 can be input to the second manipulating unit 132.

Figure 2B:
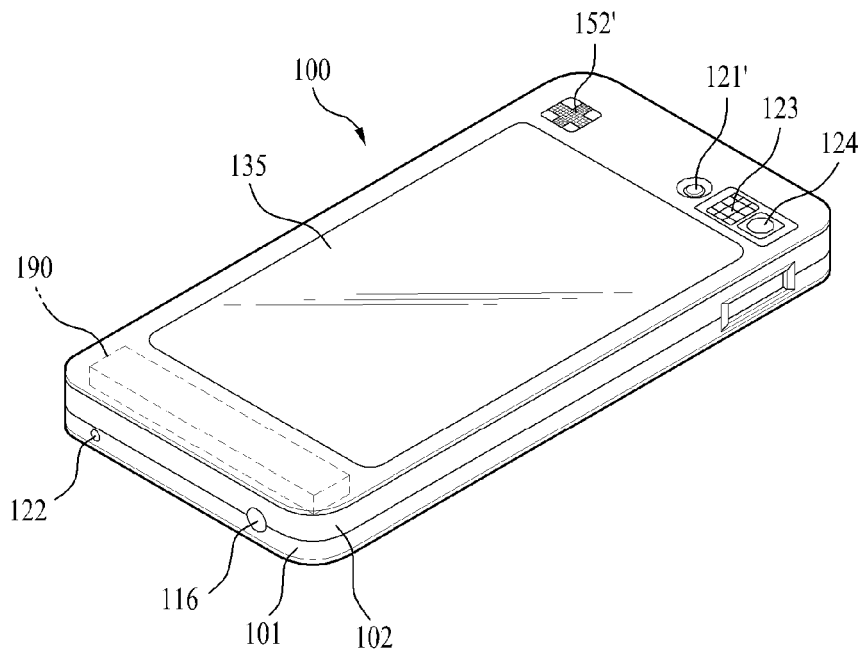
FIG. 2B is a rear perspective view of a mobile terminal according to one embodiment of the present invention.

FIG. 2B is a rear perspective view of the terminal of FIG. 2A. Referring to FIG. 2B, a camera 121' can be additionally provided at a rear of the terminal body, and more particularly, at the rear case 102. The camera 121' captures images along a direction that is substantially opposite to that of the camera 121 (see FIG. 2A) and may have a pixel resolution different from that of the camera 121.

According to one embodiment, for instance, the camera 121 has a relatively low number of pixels sufficient to capture and transmit a picture of a user's face for a video call, while the camera 121' has a relatively high number of pixels for capturing a photograph (e.g., a finer detail photograph) of a general subject. Furthermore, each of the cameras 121 and 121' can be installed on the terminal body to be rotated or popped up.

A flash 123 and a mirror 124 are additionally provided adjacent to the camera 121'. The flash 123 projects light toward a subject for photographing the subject using the camera 121'. When a user attempts to take a picture of the user (self-photography) using the camera 121', the mirror 124 enables the user to view the user's face as reflected by the mirror 124.

An additional audio output module 152' can be provided at the rear of the terminal body. The additional audio output module 152' is for implementing a stereo function together with the audio output module 152 (see FIG. 2A) and may be used for implementation of a speakerphone mode when speaking over the terminal.

A broadcast signal receiving antenna 116 can be additionally provided at the lateral side of the terminal body as well as an antenna for communication. The antenna may constitute a portion of the broadcast receiving module 111 (see FIG. 1) and be retractable into the terminal body.

A power supply unit 190 for supplying a power to the terminal 100 is provided at the terminal body. Furthermore, the power supply unit 190 can be configured to be built within the terminal body. Alternatively, the power supply unit 190 can be configured to be detachably connected to the terminal body.

A touchpad 135 for detecting a touch can be additionally provided at the rear case 102. The touchpad 135 can be configured as a light transmittive type similar to the display 151. In this case, if the display 151 is configured to output visual information from both of its faces, the visual information is viewable via the touchpad 135 as well. The information output from both of the faces can be entirely controlled by the touchpad 135. Alternatively, a display is further provided for the touchpad 135 so that a touchscreen can be provided at the rear case 102 as well.

The touchpad 135 is activated by interconnecting with the display 151 of the front case 101. The touchpad 135 can be provided at the rear of the display 151 to extend parallel to the display 151. The touchpad 135 can have a size equal to or smaller than the size of the display 151.

In the disclosure presented herein, embodiments related to a method, which can be implemented in the mobile terminal 100, for controlling the mobile terminal are described with reference to the accompanying drawings.

If the display 151 includes a touchscreen, implementation of various embodiments may be further facilitated. Therefore, according to various embodiments described below, the display 151 includes a touchscreen. Further, a display screen of the touchscreen 151 is denoted by a reference number 400.

Figure 3:
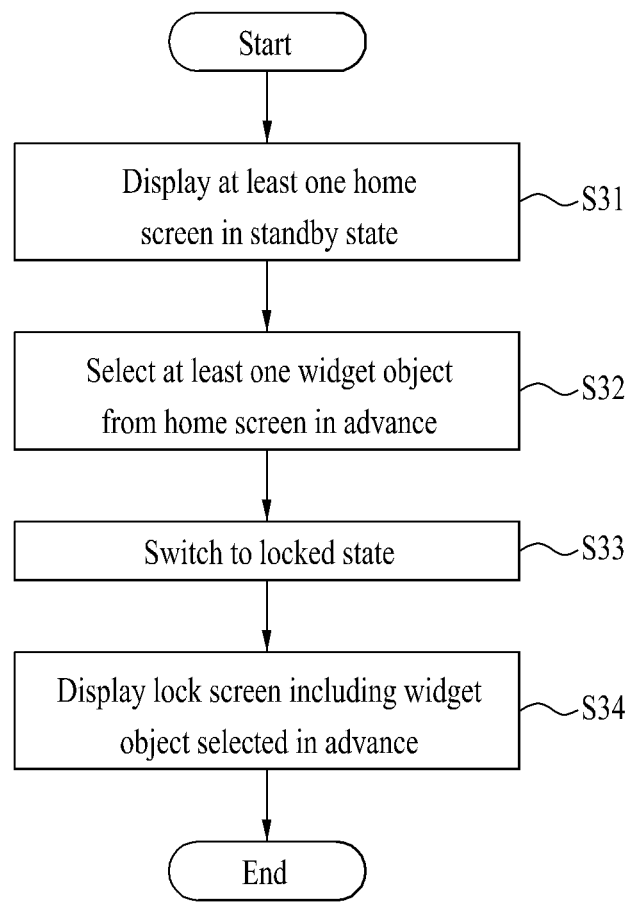
FIG. 3 is a flowchart for a method of controlling a mobile terminal according to an embodiment of the present invention.

FIG. 3 is a flowchart for a method of controlling a mobile terminal according to an embodiment of the present invention. FIGS. 4A, 4B and 4C and FIGS. 5A, 5B and 5C are views of display screen configurations for illustrating a method of controlling a mobile terminal according to an embodiment of the present invention.

The mobile terminal 100 may operate in a standby mode (or state). The controller 180 of the mobile terminal 100 may control a standby image to be displayed on the touchscreen 400 while the mobile terminal 100 is operating in the standby mode. (See, e.g., FIG. 4A.) The standby image can include at least two home screens. According one embodiment, the standby image includes two home screens, e.g., a first home screen and a second home screen (FIG. 3, S31).

Figure 4A:
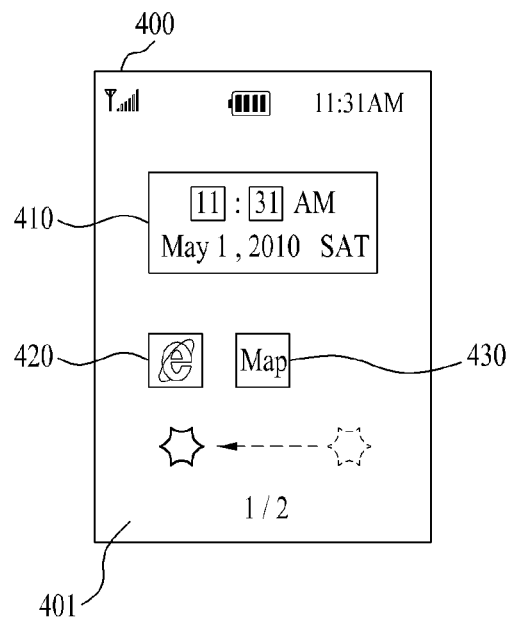
FIGS. 4A, 4B and 4C and FIGS. 5A, 5B and 5C are views of display screen configurations for illustrating a method of controlling a mobile terminal according to embodiments of the present invention.

With reference to FIG. 4A, a first home screen 401 of the two home screens is displayed. If a "touch & drag" operation is performed on the touchscreen 400 in a prescribed (or particular) direction, then, with reference to FIG. 4B, the second home screen 403 can appear by sliding in (e.g., coming into view on the touchscreen 400) while the first home screen 401 disappears by sliding out (e.g., going out of view on the touchscreen 400).

Figure 4B:
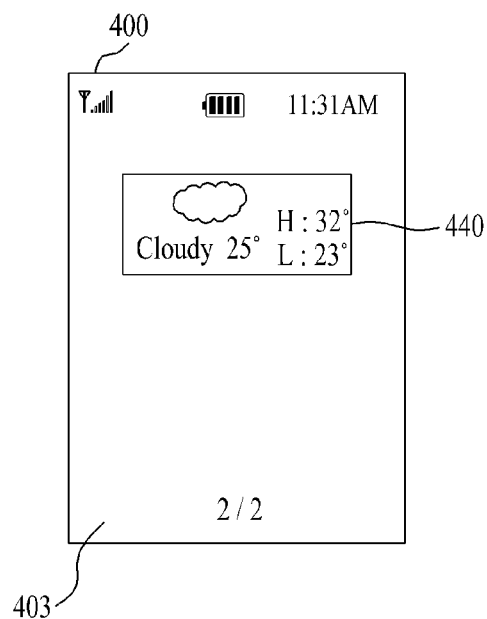

Referring to FIGS. 4A and 4B, at least one application objects 410, 420, 430 can be displayed on either the first home screen 401 or the second home screen 403. The application object conceptually includes an icon object for executing a corresponding application or a widget object for updating (or refreshing) and displaying prescribed display information periodically or irregularly via a graphic user interface. For purposes of description, the terms 'menu', 'application' and 'function' of the mobile terminal will be regarded as being equivalent to each other in that they relate to executing a corresponding function.

With reference to FIG. 4A, an Internet object 420 and a map object 430 are displayed as icon objects on the first home screen 401. Furthermore, a watch widget 410 is displayed as a widget object on the first home screen 401. With reference to FIG. 4B, a weather widget 440 is displayed as a widget object on the second home screen 403. If a prescribed touch gesture is performed on one of the application objects, the corresponding application object can be shifted (or moved) between the first home screen 401 and the second home screen 403 according to a user's preference. This aspect is understood by those skilled in the art, and, therefore, further details regarding this aspect will not be presented below.

Figure 4C:
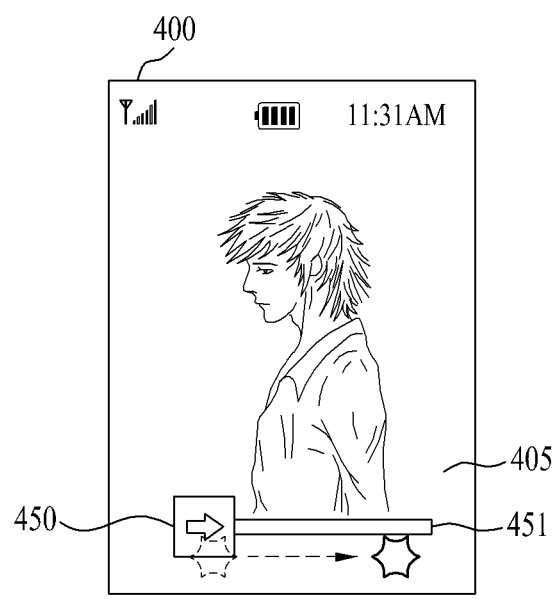

If, while the mobile terminal 100 is operating in a standby state, a user command for entering a locked state (or mode) is input or a user command input is not performed (or detected) over a prescribed duration, then, referring to FIG. 4C, the controller 180 may control the mobile terminal 100 to enter a locked state from the standby mode. The term 'locked state' refers to a state in which only certain touch gestures are recognized while only certain information is displayed on the touchscreen 400 in order to prevent (or preempt) malfunction (or incorrect manipulation) and to protect the user's privacy.

With continued reference to FIG. 4C, once the mobile terminal 100 enters the locked state, a lock screen 405 may be displayed on the touchscreen 400. An unlock icon 450 for releasing the mobile terminal 100 from the locked state may also be displayed on the lock screen 405. If the unlock icon 450 is touched & dragged along a corresponding path 451, the mobile terminal 100 is released from the locked state.

When the mobile terminal 100 enters the locked state (see, e.g., FIG. 3, S33), a widget object previously selected by a user (see, e.g., FIG. 3, S32) may be displayed on the lock screen 405 (see, e.g., FIG. 3, S34). This is described in more detail with reference to FIGS. 5A, 5B and 5C.

Figure 5A:
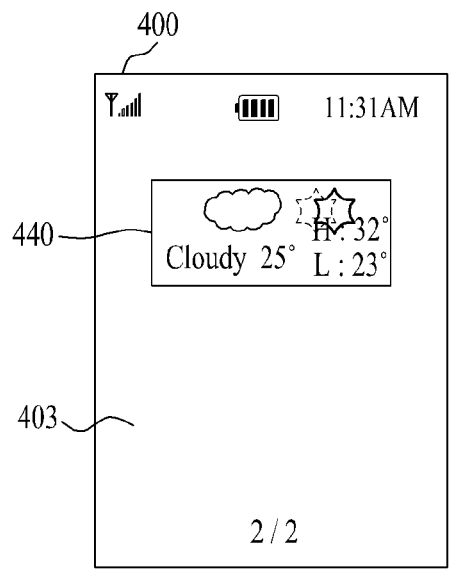
Figure 5B:
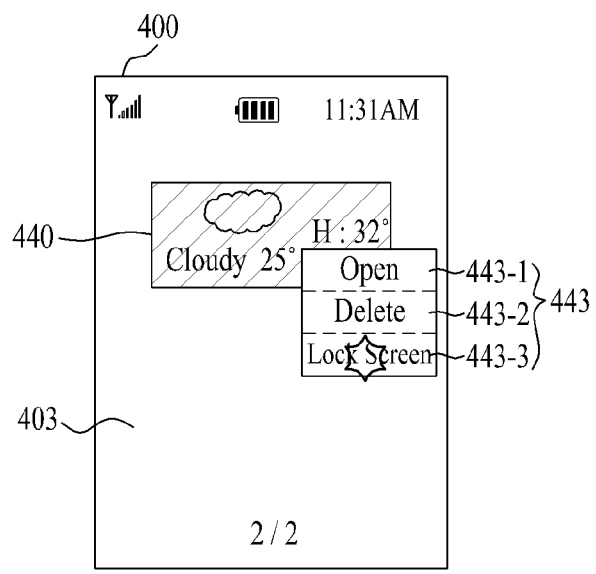

Referring to FIG. 5A, the weather widget object 440 displayed on the touchscreen 400 is selected (e.g., by a double touch) by a user. Referring to FIG. 5B, the controller 180 controls the touchscreen 400 to display a menu list 443 for the weather widget object 440 in response to the double touch of the weather widget object 440. If a 'lock screen' menu (or menu option) 443-3 is touched and selected from the menu list 443, the weather widget object 440 is set (or selected) in advance as a widget object to be displayed on the lock screen 405 when the mobile terminal 100 enters the locked state (see, e.g., FIG. 3, S34).

After the weather widget object 440 is set as the widget object to be displayed on the lock screen 405, the touchscreen 400 may return to displaying an earlier image (see, e.g., the image of FIG. 5A). Furthermore, an indicator, which indicates that the weather widget object 440 has been set as the widget object to be displayed on the lock screen 405, can be displayed on the weather widget object 440 displayed on the second home screen 403 (not shown).

Figure 5C:
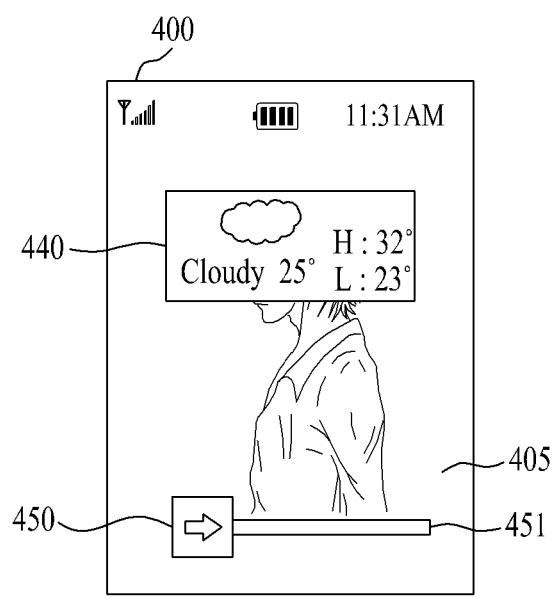

Then, after the mobile terminal 100 enters the locked state (see, e.g., FIG. 3, S33), referring to FIG. 5C, the controller 180 controls the touchscreen 400 to display the weather widget object 440 on the lock screen 405 (see, e.g., FIG. 3, S34). When at least two widget objects are set (e.g., individually set, as described earlier) as the widget objects to be displayed on the lock screen 405, it is appreciated by those skilled in the art that the controller 180 may control the touchscreen 400 to display the at least two widget objects simultaneously on the lock screen 400 (not shown). Therefore, after the user has arranged for display of a specific widget object on the lock screen, the user may continue to obtain necessary information through the specific widget object displayed on the lock screen without releasing the terminal from the locked state.

According to the embodiments described with reference to FIGS. 5A, 5B and 5C, the widget objects displayed on the home screen may be individually set as the widget objects which will be displayed on the lock screen. According to alternative embodiments, if the user sets a specific region of the home screen including specific widget objects, the specific region may be displayed on the lock screen. This will be explained in more detail with reference to FIGS. 6A, 6B, 6C and 6D.

Figure 6A:
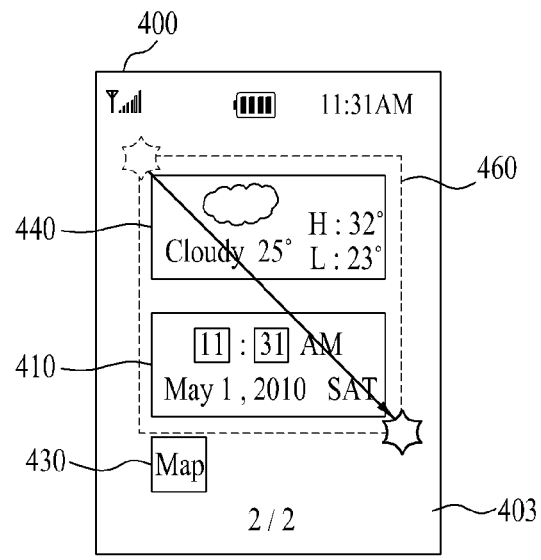
FIGS. 6A, 6B, 6C and 6D are views of display screen configurations for illustrating a method of controlling a mobile terminal according to an embodiment of the present invention.
Figure 6B:
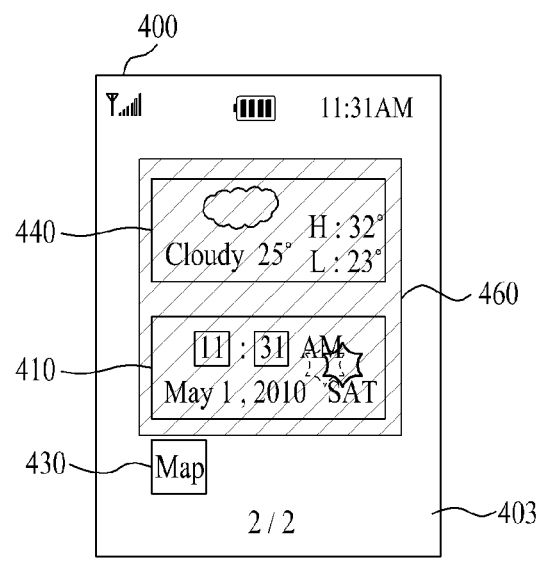

FIGS. 6A, 6B, 6C and 6D are views of display screen configurations for illustrating a method of controlling a mobile terminal according to an embodiment of the present invention. Referring to FIG. 6A, while the mobile terminal 100 is operating in the standby state, as mentioned earlier, the watch widget object 410 and the map object 430 displayed on the first home screen 401 can be shifted to the second home screen 403, on which the weather widget object 440 is displayed, according to user preference. Referring to FIG. 6B, a touch & drag operation may be performed in a diagonal direction on the touchscreen 400 such that a specific region 460 including both the weather widget object 440 and the watch widget object 410 is selected.

Figure 6C:
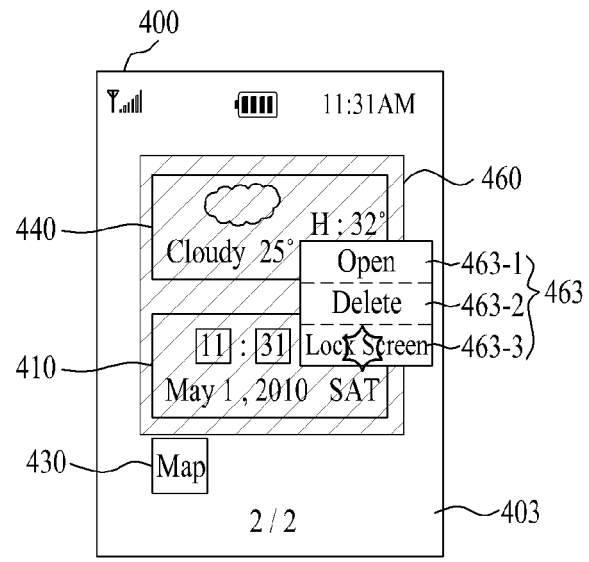
Figure 6D:
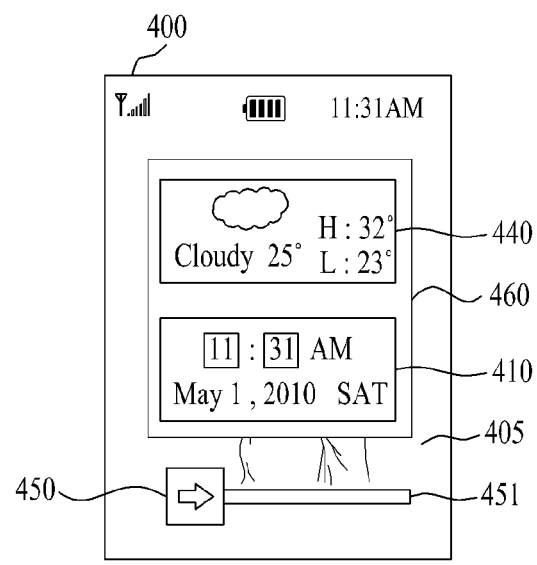

After the specific region 460 has been set, if an empty space (e.g., a blank portion) of the specific region 460 is double touched, for example, then, referring to FIG. 6C, the controller 180 may control the touchscreen 400 to display a menu list 463 for the specific region 460 in response to the double touch. If a 'Lock Screen' menu 463-3 is touched and selected from the menu list 463, the specific region 460 is set in advance as a region that will be displayed on the lock screen 405 when the mobile terminal 100 enters the locked state. After the specific region 460 is set as the region to be displayed on the lock screen 405, the touchscreen 400 may return to displaying an earlier image (see, e.g., the image of FIG. 6A). Furthermore, respective indicators, which indicate that the weather widget object 440 and the watch widget object 410 have been set as the widget objects to be displayed on the lock screen 405, can be displayed on the weather widget object 440 and the watch widget object 410 displayed on the second home screen 403 (not shown). Then, after the mobile terminal 100 enters the locked state, referring to FIG. 6D, the controller 180 controls the touchscreen 400 to display the specific region 460 including both the weather widget object 440 and the watch widget object 410 on the lock screen 405.

According to the embodiments described with reference to FIGS. 6A, 6B, 6C and 6D, when the specific region is set to include at least two widget objects on the second home screen, the set specific region is displayed on the lock screen. According to alternative embodiments, when the mobile terminal enters the locked state, the whole (or entire) second home screen may be displayed as the lock screen on the touchscreen 400. This will be explained in more detail with reference to FIGS. 7A, 7B and 7C.

Figure 7A:
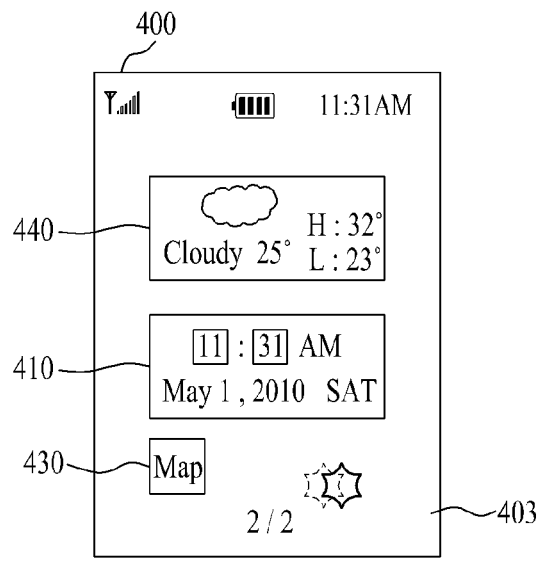
FIGS. 7A, 7B and 7C are views of display screen configurations for illustrating a method of controlling a mobile terminal according to an embodiment of the present invention.
Figure 7B:
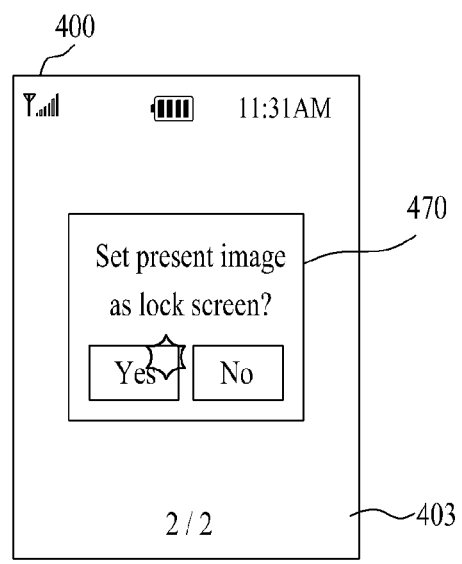
Figure 7C:
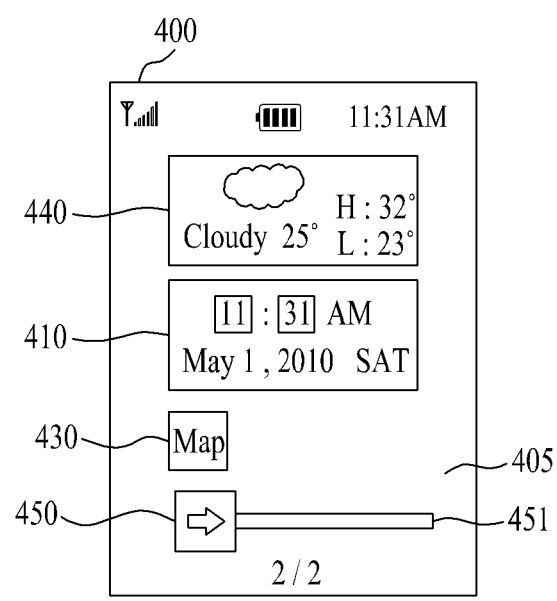

FIGS. 7A, 7B and 7C are views of display screen configurations for illustrating a method of controlling a mobile terminal according to an embodiment of the present invention. Referring to FIG. 7A, when the mobile terminal 100 is operating in the standby state, as mentioned earlier, the watch widget object 410, the map object 430 and the weather widget object 440 may be displayed on the second home screen according to user preference. Referring to FIG. 7C, if a double touch is performed on an empty space (or blank portion) of the second home screen 403, the controller 180 may control the touchscreen 400 to display a query window 470 for querying whether to set the second home screen 403 as the lock screen 405. The user is then able to set the second home screen 403, in advance, as the lock screen 405 via the query window 470.

After the second home screen 403 is set as the lock screen 405, the touchscreen 400 may return to displaying an earlier image (see, e.g., the image of FIG. 7A). Furthermore, an indicator, which indicates that the second home screen 403 has been set as the lock screen 405, can be displayed on the second home screen 403 (not shown). Then, after the mobile terminal 100 enters the locked state, referring to FIG. 7C, the controller controls the touchscreen 400 to display the second home screen 403 as the lock screen 405. Because the second home screen 403 is displayed as the lock screen 405, if the mobile terminal enters the locked state, the watch widget object 410, the map object 430 and the weather widget object 440 previously arranged on the second home screen 403 are accordingly displayed on the touchscreen 400.

The display of the widget objects on the lock screen 405 may be updated or refreshed according to a prescribed time interval. This will be explained in more detail with reference to FIGS. 8A, 8B and 8C.

Figure 8A:
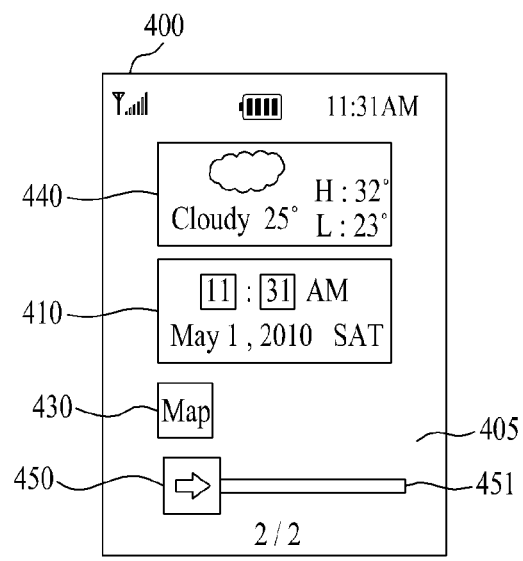
FIGS. 8A, 8B and 8C are views of display screen configurations for illustrating a method of controlling a mobile terminal according to an embodiment of the present invention.
Figure 8B:
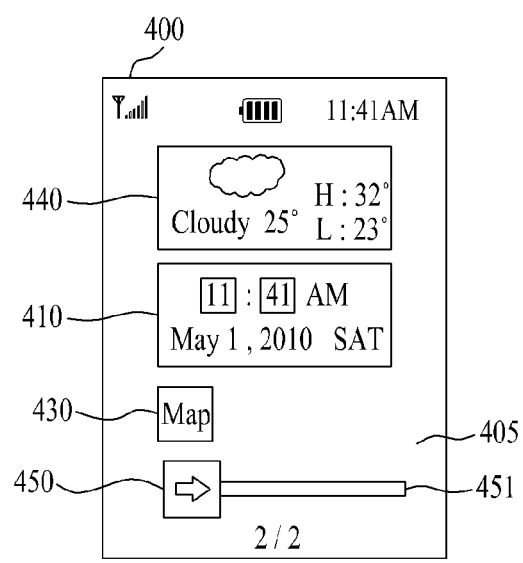
Figure 8C:
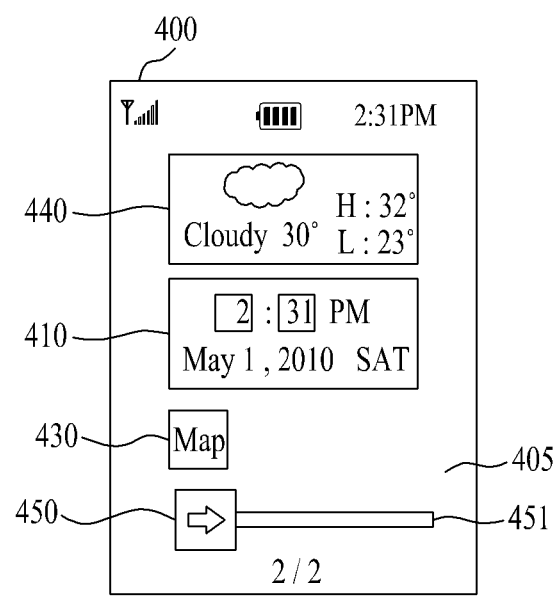

FIGS. 8A, 8B and 8C are views of display screen configurations for illustrating a method of controlling a mobile terminal according to an embodiment of the present invention. Referring to FIG. 8A, while the mobile terminal 100 is operating in the locked state, the lock screen 405 is displayed on the touchscreen 400 such that the watch widget object 410 and the weather widget object 440 are displayed on the lock screen 405. The information respectively displayed by the watch widget object 410 and the weather widget object 440 may be refreshed according to a cycle (or rate) equal to or longer than (or slower than) a cycle (or rate) according to which the information is refreshed when the mobile terminal is operating in the standby state. Because the watch widget object 410 and the weather widget object 440 are refreshed according to the longer cycle (or slower rate), power consumption of the mobile terminal 100 in the locked state is lower than power consumption of the mobile terminal 100 in the standby state.

The watch widget object 410 and the weather widget object 440 displayed on the lock screen 405 may be refreshed according to the same cycle or may be refreshed according to different respective cycles. For instance, the refresh cycle of the watch widget object 410 may be set to a first cycle (e.g., 10 minutes), and the refresh cycle of the weather widget object 440 may be set to a second cycle (e.g., 3 hours). Therefore, referring to FIG. 8B, after the mobile terminal 100 has entered the locked state, when the first cycle elapses, the controller 180 refreshes the display of the watch widget object 410 and controls the touchscreen 400 to display the refreshed display information (i.e., refreshed watch information). Referring to FIG. 8C, after the mobile terminal 100 has entered the locked state, when the second cycle elapses, the controller 180 refreshes the display of the weather widget object 440 and controls the touchscreen 400 to display the refreshed display information (i.e., refreshed weather information).

Furthermore, a user may set the refresh cycle of the watch widget object 410 and the refresh cycle of the weather widget object in advance by inputting a prescribed user command via the user input unit 130. Alternatively, the watch widget object 410 and the weather widget object 440 may be refreshed either individually or in common (together) in response to a manual command—e.g., each time a prescribed user command is input via the user input unit 130, instead of being automatically refreshed according to prescribed cycles (not shown). Alternatively, when the watch widget object 410 and the weather widget object 440 are refreshed according to prescribed cycles, if a level of a battery power source of the mobile terminal is (determined to be) equal to or lower than a predetermined level, then the refresh can be interrupted (or temporarily halted) in order to save power consumption (not shown). Further details regarding the above-described embodiments would be understood by those skilled in the art, and, therefore, such further details will not be presented below.

According to embodiments described with reference to FIGS. 3 to 8, the widget object is displayed on the lock screen. According to alternative embodiments, if a prescribed application is being executed in the mobile terminal 100, at least one portion of an image of the executed application is displayed on the lock screen. This will be described in further detail with reference to FIG. 9 and FIGS. 10A, 10B and 10C.

Figure 9:
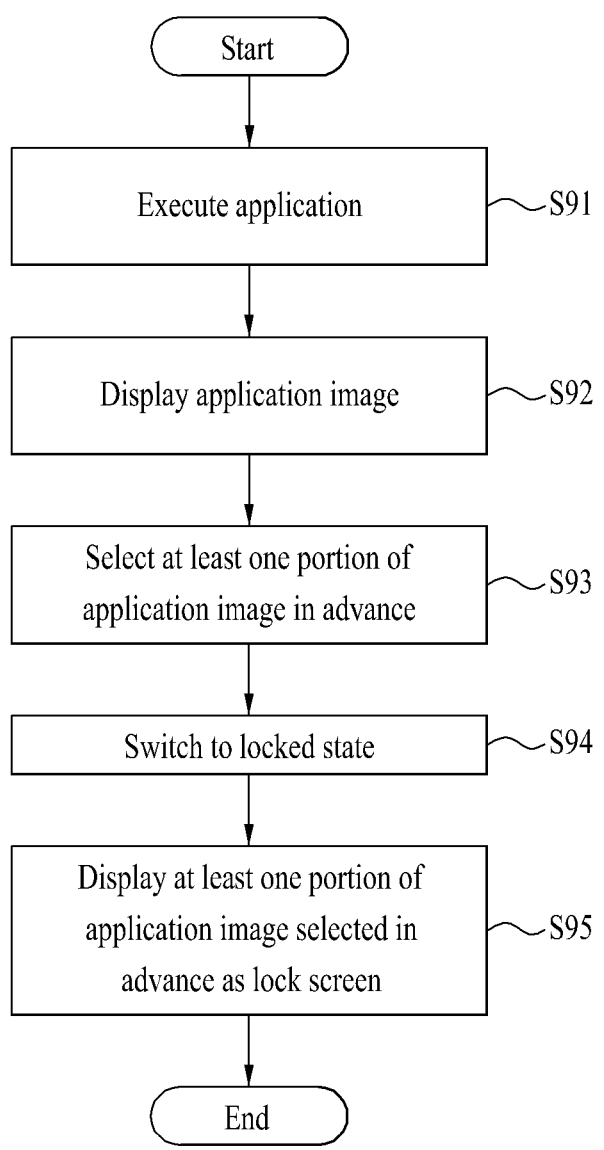
FIG. 9 is a flowchart for a method of controlling a mobile terminal according to an embodiment of the present invention.
Figure 10A:
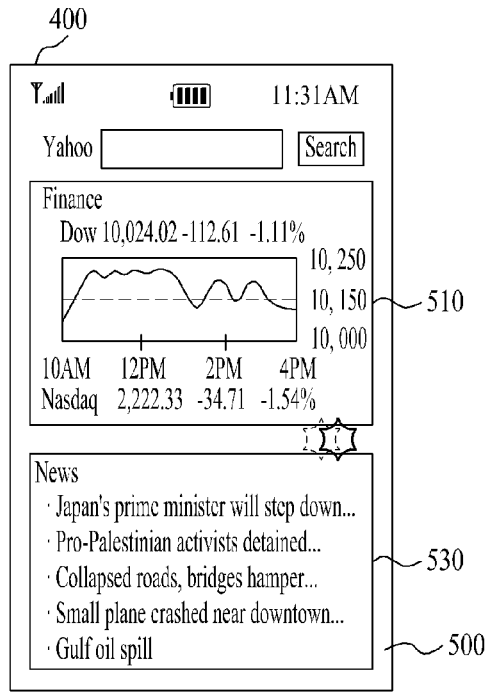
FIGS. 10A, 10B and 10C are views of display screen configurations for illustrating a method of controlling a mobile terminal according to an embodiment of the present invention.
Figure 10B:
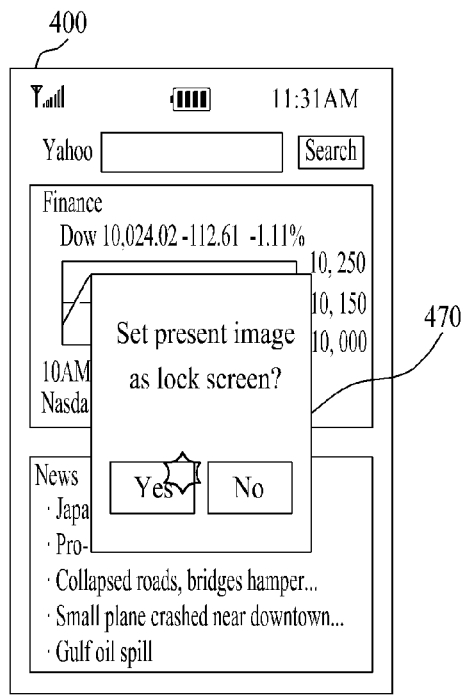
Figure 10C:
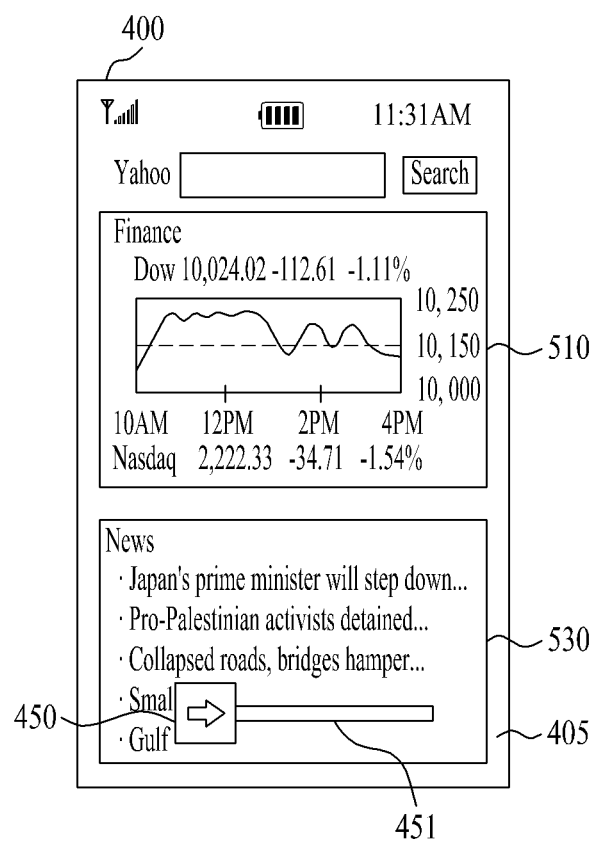

FIG. 9 is a flowchart for a method of controlling a mobile terminal according to an embodiment of the present invention. FIGS. 10A, 10B and 10C are views of display screen configurations for illustrating a method of controlling a mobile terminal according to an embodiment of the present invention.

Referring to FIG. 10A, an Internet application is executed in the mobile terminal 100 (FIG. 9, S91) and an image 500 of the Internet application (i.e., a webpage image) is displayed on the touchscreen 400 (FIG. 9, S92). If a double touch is performed on an empty space (e.g., a blank portion) of the Internet application image 500, then, referring to FIG. 10B, the controller 180 controls the touchscreen 400 to display a query window 470 for querying whether to set the internet application image 500 as the lock screen to be displayed. The user is accordingly able to set, in advance, the Internet application image 500 as the lock screen 405 via the query window 470 (FIG. 9, S93).

After the Internet application image 500 has been set in advance as the lock screen 405, the touchscreen 400 may return to displaying a previous image (e.g., the image of FIG. 10A). In addition, an indicator, which indicates that the Internet application image 500 is set as the lock screen 405, may be displayed on the Internet application image 500 (not shown). When the mobile terminal 100 later enters the locked state (FIG. 9, S94), referring to FIG. 10C, the controller 180 controls the touchscreen 400 to display the Internet application image 500 as the lock screen 405 (FIG. 9, S95).

Similar to embodiments described earlier, the Internet application image 500 displayed as the lock screen 405 may be automatically refreshed based on a preset time interval. Alternatively, the Internet application image 500 displayed as the lock screen 405 may be refreshed on a manual basis (e.g., each time a prescribed user command is input).

According to embodiments described with reference to FIGS. 10A, 10B and 10C, if the Internet application image 500 has been previously set as the lock screen 405, when the mobile terminal 100 enters the locked state, the Internet application image 500 is displayed on the touchscreen 400. According to an alternative embodiment, when the mobile terminal 100 enters the locked state in the course of displaying the Internet application image 500 on the touchscreen 400, the controller 180 controls the touchscreen 400 to display the Internet application image 500 as the lock screen even though the Internet application image has not been set in advance as the lock screen (not shown).

According to embodiments described with reference to FIGS. 10A, 10B and 10C, when the mobile terminal 100 enters the locked state, the entire Internet application image is displayed on the touchscreen 400. According to other embodiments, when the mobile terminal 100 enters the locked state, the Internet application image 500 is partially displayed on the touchscreen 400. This is described in more detail with reference to FIGS. 11A, 11B and 11C.

Figure 11C:
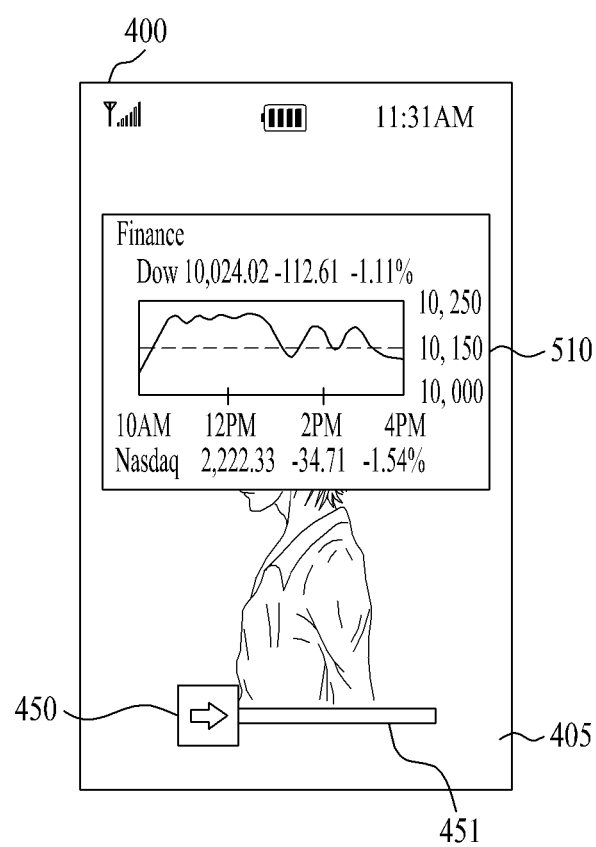

FIGS. 11A, 11B, and 11C are views of display screen configurations for illustrating a method of controlling a mobile terminal according to an embodiment of the present invention. Referring to FIG. 11A, an Internet application is executed in the mobile terminal 100, and an image 500 of the Internet application (i.e., a webpage image) is displayed on the touchscreen 400. The Internet application image 500 may include at least two sections (e.g., a stock section 510 and a news section 530). If a double touch is performed on an empty space (or blank portion) of the stock section 510, then, referring to FIG. 11B, the controller 180 controls the touchscreen 400 to display a query window 473 for querying whether to set the stock section 510 as the lock screen. The user is accordingly able to set, in advance, the stock section 510 as the lock screen 405 via the query window 473.

After the stock section 510 is set, in advance, as the lock screen 405, the touchscreen 400 may return to displaying an earlier image (e.g., the image of FIG. 11A). Furthermore, an indicator, which indicates that the stock section 510 is set as the lock screen 405, may be displayed on the Internet application image 500 (not shown). When the mobile terminal 100 later enters the locked state, referring to FIG. 11C, the controller 180 controls the touchscreen 400 to display the stock section 510 as the lock screen 405.

Similar to embodiments described earlier, the stock section 510 displayed on the lock screen 405 may be automatically refreshed according to preset time interval. Alternatively, the stock section 510 displayed on the lock screen 405 may be refreshed on a manual basis (e.g., each time a prescribed user command is input).

Figure 12A:
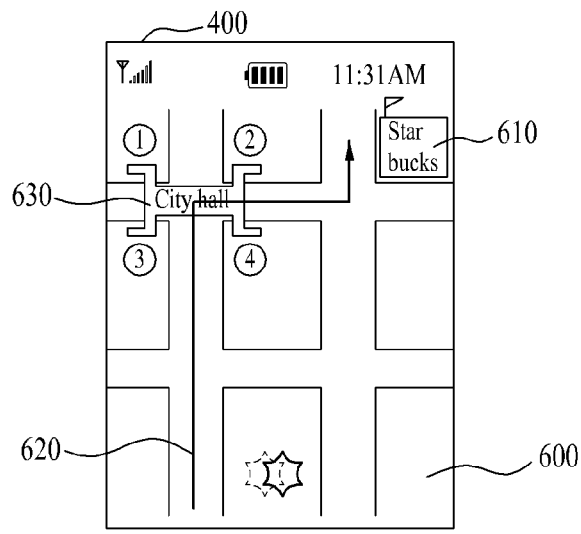
FIGS. 12A, 12B, 12C and 12D are views of display screen configurations for illustrating a method of controlling a mobile terminal according to an embodiment of the present invention.
Figure 12B:
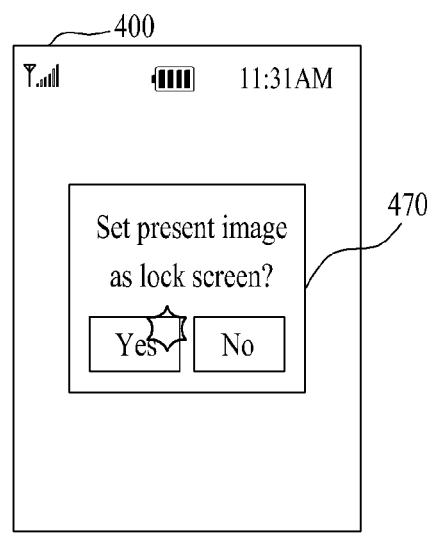
Figure 12C:
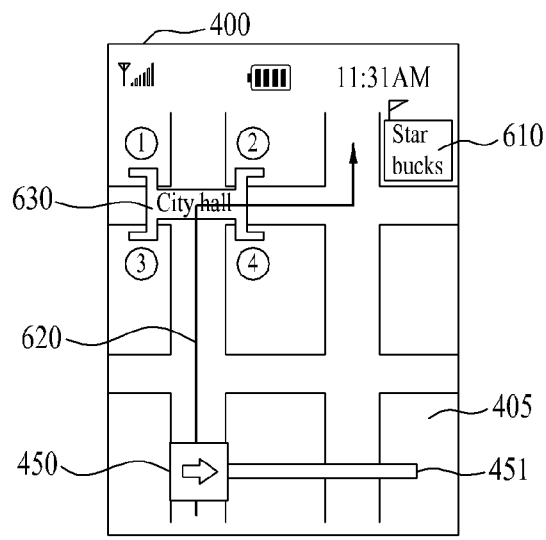

According to other embodiments, a method for displaying an application image as the lock screen instead of the Internet application image is described with reference to FIGS. 12A, 12B, 12C and 12D. FIGS. 12A, 12B and 12C are view of display screen configurations for illustrating a method of controlling a mobile terminal according to an embodiment of the present invention. Referring to FIG. 12A, a map application is executed in the mobile terminal 100, and an image 600 of (or corresponding to) the map application is displayed on the touchscreen 400. During execution of the map application, a destination 610 may be input by a user, and a path 620 to the destination 610 and a landmark 630 on the path 620 may be displayed on the map application image 600. Such features are understood by those skilled in the art, and, therefore, these features will not be described in more detail below.

If a double touch is performed on an empty space (or blank portion) of the map application image 600, then, referring to FIG. 12B, the controller 180 may control the touchscreen 400 to display a query window 470 for querying whether to set the map application image 600 as the lock screen 405. The user is accordingly able to set, in advance, the map application image 600 as the lock screen 405 via the query window 470. After the map application image 600 is set, in advance, as the lock screen 405, the touchscreen 400 may return to displaying an earlier image (e.g., the image of FIG. 12A). In addition, an indicator, which indicates that the map application image 600 is set as the lock screen 405, may be displayed on the map application image 600 (not shown). Then, when the mobile terminal 100 later enters the locked state, referring to FIG. 12C, the controller 180 controls the touchscreen 400 to display the map application image 600 as the lock screen 405.

Figure 12D:
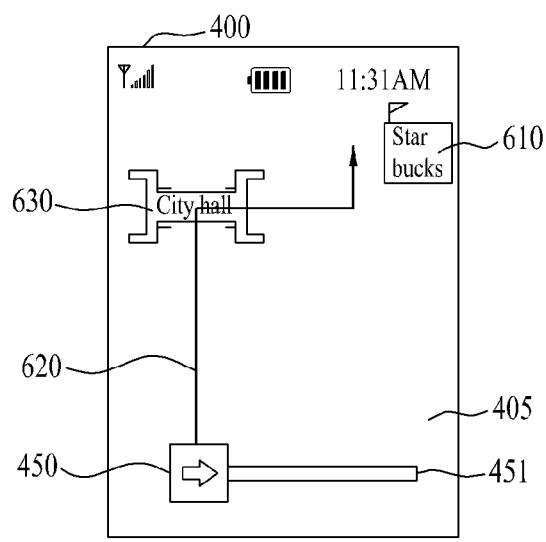

Alternatively, when the mobile terminal 100 enters the locked state, referring to FIG. 12D, the controller 180 controls the touchscreen 400 to display a schematized image of the map application image 600 as the lock screen 405. For example, the destination 610, the path 620 to the destination 610 and the landmark 630 on the path 620 may be displayed on the schematized map application image.

According to described embodiments, the widget object or the application image is displayed on the lock screen. According to other embodiments, while the mobile terminal 100 is operating in the locked state, if an event occurs, an indicator of the occurring (or occurred) event may be displayed. This is described in more detail with reference to FIG. 13 and FIGS. 14A, 14B, 14C and 14D.

Figure 13:
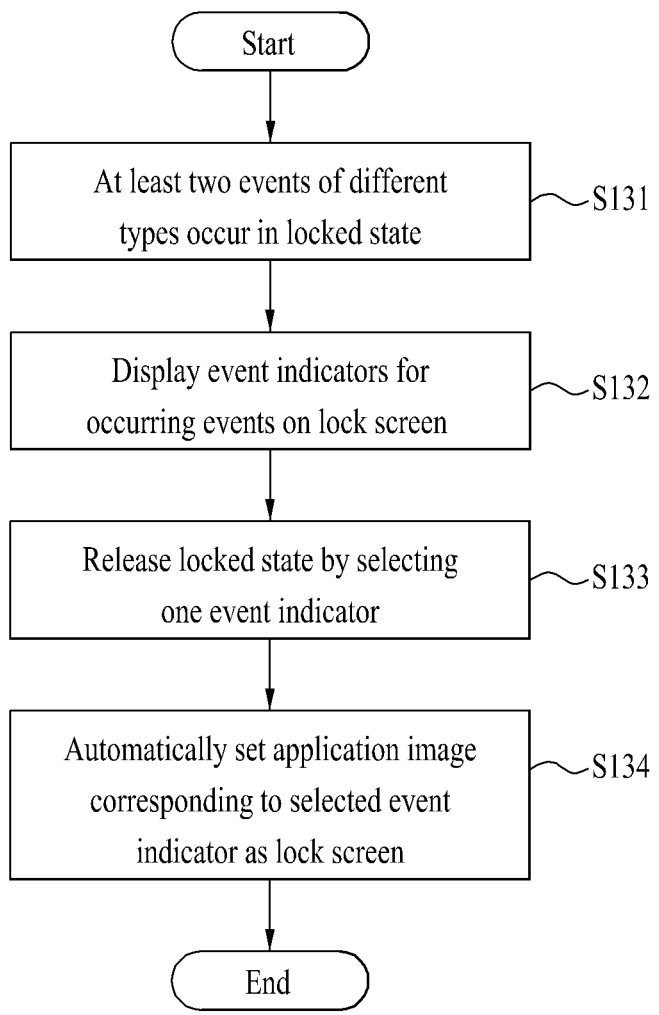
FIG. 13 is a flowchart for a method of controlling a mobile terminal according to an embodiment of the present invention.

FIG. 13 is a flowchart for a method of controlling a mobile terminal according to an embodiment of the present invention. FIGS. 14A, 14B, 14C and 14D are views of display screen configurations for implementing a method of controlling a mobile terminal according to an embodiment of the present invention.

Figure 14A:
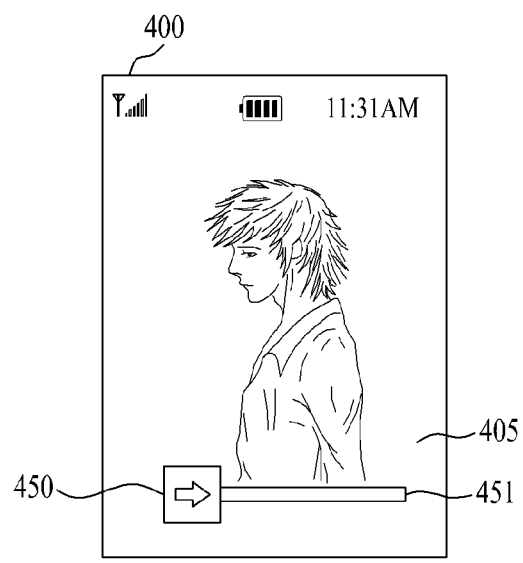
FIGS. 14A, 14B, 14C and 14D are views of display screen configurations for illustrating a method of controlling a mobile terminal according to an embodiment of the present invention.
Figure 14B:
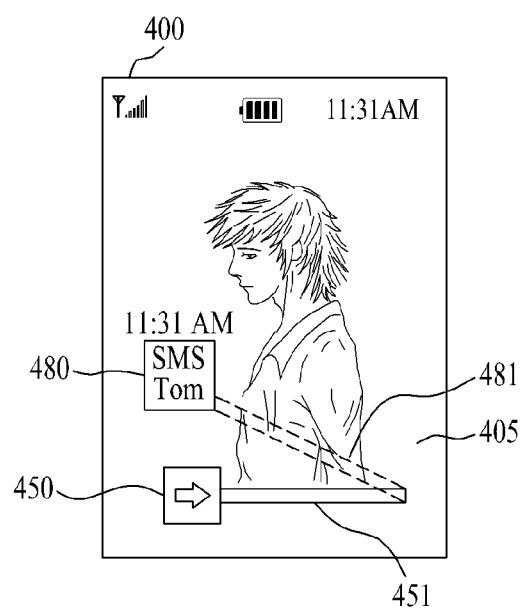
Figure 14C:
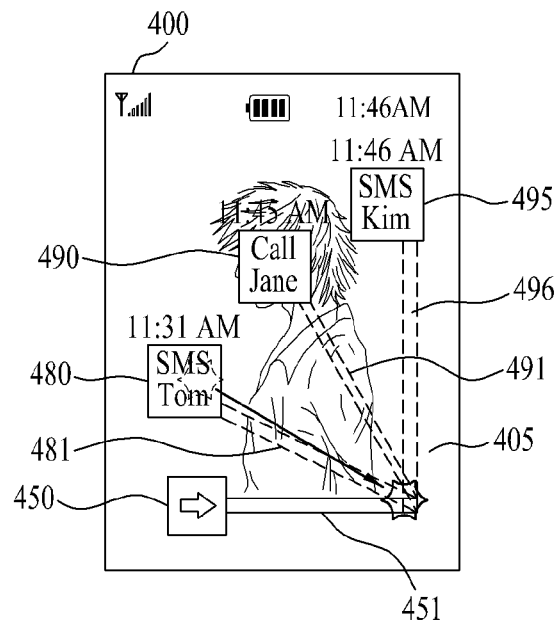

Referring to FIG. 14A, the mobile terminal 100 is operating in the locked state, and the lock screen 405 is displayed on the touchscreen 400. While the mobile terminal 100 is operating in the locked state, a first event may occur in the mobile terminal 100. The occurrence of the first event may have nothing to do with a user's manipulation of the user input unit 130 (as in during a normal operation of the mobile terminal). In the following description, it is assumed, for example, that the first event includes a message reception from a first counterpart. If the first event occurs, then, referring to FIG. 14B, the controller 180 controls the touchscreen 400 to display a first indicator 480, which indicates that the first event has occurred, on the lock screen 405. In particular, the first indicator 480 may be displayed together with a corresponding path 481.

While the mobile terminal 100 remains operating in the locked state after the first event occurrence, a second event and a third event can occur in the mobile terminal (FIG. 13, S131). The occurrence of each of the second and third events may have nothing to do with a user's manipulation of the user input unit 130 (as in during a normal operation of the mobile terminal). In the following description, it is assumed that the second event and the third event include a phone call reception from a second counterpart and a message reception from a third counterpart, respectively.

Figure 14D:
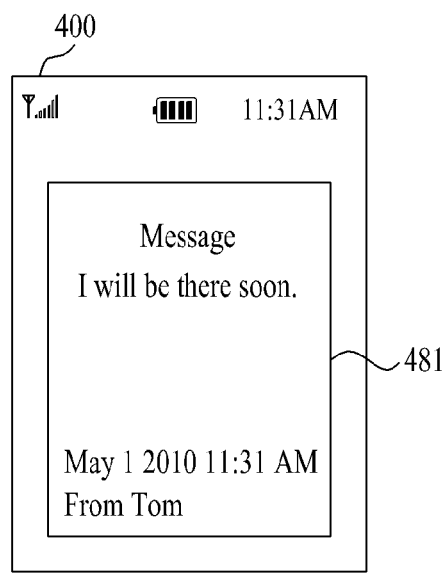

If the second event and the third event occur, then, referring to FIG. 14D, the controller 180 controls the touchscreen 400 to display a second indicator 490 indicating the second event occurrence and a third indicator 495 indicating the third event occurrence simultaneously (or concurrently) on the lock screen 405 together with the first indicator 480 (FIG. 13, S132). In doing so, the second and third indicators 490 and 495 may be displayed together with corresponding respective paths 491 and 496.

As described earlier, the first and third events are message reception events, and the second event is a phone call reception event. As such, the type of the first and third events is different from the type of the second event.

The first, second and third indicators 480, 490 and 495 may be displayed in order of the respective occurrence times of the corresponding events. In doing so, with reference to FIG. 14C, the first, second and third indicators 480, 490 and 495 may be displayed together with occurrence time information of the corresponding events.

The first indicator 480 may be selected and then touched & dragged along the corresponding path 481. If so, the controller 180 may control the mobile terminal 100 such that the mobile terminal 100 is released from the locked state (FIG. 13, S133). When the mobile terminal 100 is released from the locked state, referring to FIG. 14D, the controller 180 controls the touchscreen to switch from displaying the lock screen to displaying a corresponding application image (i.e., a message application image) of the first indicator 480 (FIG. 13, S134). Furthermore, the controller 180 may control the touchscreen to directly display information regarding the first event, e.g., the message received from the first counterpart, on the message application image.

If the second indicator 490 is selected and then touched and dragged along its corresponding path 491 while the mobile terminal is operating in the locked state, the controller 180 controls the touchscreen to switch from displaying the lock screen to displaying a corresponding application image (i.e., a phone call application image) of the second indicator 490. The controller 180 may control the touchscreen to directly display information regarding the second event, e.g., information regarding the second counterpart, on the phone call application image.

Embodiments of the present invention provide various effects and/or features. According to at least one embodiment of the present invention, when a mobile terminal enters a locked state, various kinds of useful information are displayed on a lock screen of the mobile terminal. According to at least one embodiment of the present invention, a user may select various kinds of useful information to be displayed on a lock screen. According to at least one of embodiments of the present invention, a mobile terminal can be released from a locked state in further consideration of user's convenience.

In addition, described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, and optical data storage devices, for example, and may also include carrier-wave type implementations (e.g., transmission via the Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen configured to display:
at least one home screen or a lock screen; and
a controller configured to:
control the touchscreen to display the at least one home screen when the mobile terminal is in a standby state, one of the at least one home screen including at least one object;
control the touchscreen to display the lock screen when the mobile terminal is switched to a locked state, wherein an unlock icon and an unlock path are displayed as a main unlock graphic on the lock screen; and
control the mobile terminal to be released from the locked state when the unlock icon is touch-dragged along the unlock path,
wherein the controller is further configured to:
in response to occurrence of a first event during the locked state, control the touchscreen to display a first event indicator on the lock screen together with the main unlock graphic; and
in response to occurrence of a second event after the occurrence of the first event during the locked state, control the touchscreen to display a second event indicator on the lock screen together with the main unlock graphic and the first event indicator, and
wherein:

when the first event indicator is touch-dragged along its corresponding first event path on the lock screen, the mobile terminal is released from the locked state such that the lock screen is directly changed into a first event screen associated with the first event, and when the second event indicator is touch-dragged along its corresponding second event path on the lock screen, the mobile terminal is released from the locked state such that the lock screen is directly changed into a second event screen associated with the second event, wherein the first event indicator associated with the first event occurring earlier than the second event is displayed closer to the main unlock graphic than the second event indicator associated with the second event occurring later than the first event, wherein a first event type of the first event is indicated within the first event indicator, and a second event type of the second event is indicated within the second event indicator;

wherein the first event is related to a first message from a first counterpart during the locked state, the second event is related to a call from a second counterpart after receiving the first message during the locked state; and wherein the first and second event paths associated with the first and second events are longer than the unlock path of the main unlock graphic.

2. The mobile terminal of claim 1, wherein the controller is further configured to control the touchscreen to shift display of one of the at least one object from the one of the at least one home screen to another of the at least one home screen in response to receipt of an input from a user.

3. The mobile terminal of claim 2, wherein the lock screen displays the one of the at least one home screen if the one of the at least one home screen was selected for the lock screen.

4. The mobile terminal of claim 2, wherein the lock screen displays only a specific region of the one of the at least one home screen if the specific region was selected for the lock screen.

5. The mobile terminal of claim 1, wherein the lock screen displays at least a portion of an image of an application corresponding to one of the at least one object if the mobile terminal is switched from the standby state to the locked state when the mobile terminal is executing the application.

6. The mobile terminal of claim 5, wherein:
the lock screen displays a schematized version of the at least a portion of the image.

7. The mobile terminal of claim 5, wherein the at least a portion of the image comprises a specific region of the image selected for the lock screen.

8. The mobile terminal of claim 5, wherein the controller is further configured to refresh the display of the at least a portion of the image either based on a preset time interval or in response to receipt of a command from a user.

9. The mobile terminal of claim 1, wherein the at least one object includes one or more widget objects, and the lock screen displays a specific widget object of the one or more widget objects if the specific widget object was selected for the lock screen, and wherein the controller is further configured to control the touchscreen to refresh a display of information corresponding to the specific widget object on the lock screen according to a preset time interval.

10. The mobile terminal of claim 9, wherein:
the lock screen further displays a second specific widget object of the one or more widget objects selected for the lock screen; and the controller is further configured to control the touchscreen to refresh a display of information corresponding to the second specific object on the lock screen according to a second preset time interval having a different length with respect to the preset time interval.

11. The mobile terminal of claim 9, further comprising a battery, wherein the controller is further configured to stop refreshing the display of the information corresponding to the specific widget object if it is determined that a power level of the battery is below a threshold level.

12. The mobile terminal of claim 9, wherein the controller is further configured to control the touchscreen to refresh a display of information corresponding to the specific widget object on the lock screen in response to receipt of a command from a user.

13. The mobile terminal of claim 9, wherein the lock screen displays a schematized version of the specific widget object.

14. The mobile terminal of claim 1, wherein the first event path is displayed together with the main unlock graphic and the first event indicator and the second event indicator on the lock screen, and wherein the second event path is displayed together with the main unlock graphic and the first event indicator and the second event indicator on the lock screen.

15. The mobile terminal of claim 1, wherein the controller is further configured to:
display the first event indicator together with a first correspondent identifier and a reception time of the first message as a first sub unlock graphic, and
display the second event indicator together with a second correspondent identifier and a reception time of the call as a second sub unlock graphic.

16. The mobile terminal of claim 15, wherein both the first and second sub unlock graphics are displayed together with the main unlock graphic and a current time.

17. The mobile terminal of claim 15, wherein the controller is further configured to:
display the first sub unlock graphic closer to the main unlock graphic than the second sub unlock graphic.

18. The mobile terminal of claim 1, wherein the controller is further configured to:
receive a second message from a third counterpart after receiving the call during the locked state as a third event; and
in response to receiving the second message during the locked state, control the touchscreen to display a third event indicator on the lock screen together with and separately from the first event indicator.

19. The mobile terminal of claim 18, wherein the controller is further configured to display the third event indicator together with a third correspondent identifier and a reception time of the second message as a third sub unlock graphic.

20. The mobile terminal of claim 1, wherein when the first event indicator is touch-dragged along the first event path, the first event indicator including the indicated first event type is moved along the first event path, and wherein when the second event indicator is touch-dragged along the second event path, the second event indicator including the indicated second event type is moved along the second event path.

21. A method of controlling a mobile terminal, the method comprising:
controlling a touchscreen of the mobile terminal to display at least one home screen when the mobile terminal is in a standby state, one of the at least one home screen including at least one object;

controlling the touchscreen to display a lock screen when the mobile terminal is switched to a locked state, wherein an unlock icon and an unlock path are displayed as a main unlock graphic on the lock screen; and controlling the mobile terminal to be released from the locked state when the unlock icon is touch-dragged along the unlock path, wherein the method further comprises:
  in response to occurrence of a first event during the locked state, controlling the touchscreen to display a first event indicator on the lock screen together with the main unlock graphic; and
  in response to occurrence of a second event after the occurrence of the first event during the locked state, controlling the touchscreen to display a second event indicator on the lock screen together with the main unlock graphic and the first event indicator, and wherein:
  when the first event indicator is touch-dragged along its corresponding first event path on the lock screen, the mobile terminal is released from the locked state such that the lock screen is directly changed into a first event screen associated with the first event, and
  when the second event indicator is touch-dragged along its corresponding second event path on the lock screen, the mobile terminal is released from the locked state such that the lock screen is directly changed into a second event screen associated with the second event, wherein the first event indicator associated with the first event occurring earlier than the second event is displayed closer to the main unlock graphic than the second event indicator associated with the second event occurring later than the first event, wherein a first event type of the first event is indicated within the first event indicator, and a second event type of the second event is indicated within the second event indicator;

wherein the first event is related to a first message from a first counterpart during the locked state, the second event is related to a call from a second counterpart after receiving the first message during the locked state; and wherein the first and second event paths associated with the first and second events are longer than the unlock path of the main unlock graphic.

22. The method of claim 21, wherein the lock screen displays the one of the at least one home screen if the one of the at least one home screen was selected for the lock screen.

23. The method of claim 21, wherein the one of the at least one home screen includes at least one application object including one or more widget objects, and the lock screen displays a specific widget object of the one or more widget objects if the specific widget object was selected for the lock screen, and
  wherein the method further comprises controlling the touchscreen to refresh a display of information corresponding to the specific widget object on the lock screen according to a preset time interval.

24. The method of claim 23, further comprising no longer refreshing the display of the information corresponding to the specific widget object if it is determined that a power level of a battery of the mobile terminal is below a threshold level.

25. The method of claim 21, wherein the lock screen displays at least a portion of an image of an application corresponding to one of the at least one object if the mobile terminal is switched from the standby state to the locked state when the mobile terminal is executing the application.

26. The method of claim 25, wherein the lock screen displays a schematized version of the at least a portion of the image.

27. The method of claim 21, wherein the first event path is displayed together with the main unlock graphic and the first event indicator and the second event indicator on the lock screen, and
  wherein the second event path is displayed together with the main unlock graphic and the first event indicator and the second event indicator on the lock screen.

28. The method of claim 21, further comprising:
  displaying the first event indicator together with a first correspondent identifier and a reception time of the first message as a first sub unlock graphic, and
  displaying the second event indicator together with a second correspondent identifier and a reception time of the call as a second sub unlock graphic.

29. The method of claim 28, wherein both the first and second sub unlock graphics are displayed together with the main unlock graphic and a current time.

30. The method of claim 28, further comprising:
  displaying the first sub unlock graphic closer to the main unlock graphic than the second sub unlock graphic.

31. The method of claim 21, further comprising:
  receiving a second message from a third counterpart after receiving the call during the locked state as a third event; and
  in response to receiving the second message during the locked state, controlling the touchscreen to display a third event indicator on the lock screen together with and separately from the first event indicator.

32. The method of claim 31, further comprising:
  displaying the third event indicator together with a third correspondent identifier and a reception time of the second message as a third sub unlock graphic.

33. The method of claim 21, wherein when the first event indicator is touch-dragged along the first event path, the first event indicator including the indicated first event type is moved along the first event path, and
  wherein when the second event indicator is touch-dragged along the second event path, the second event indicator including the indicated second event type is moved along the second event path.

* * * * *